United States Patent [19]
Oh

[11] 3,956,167
[45] May 11, 1976

[54] LIQUID CRYSTAL COMPOSITIONS AND DEVICES

[75] Inventor: Chan Soo Oh, Diamond Bar, Calif.

[73] Assignee: Beckman Instruments, Inc., Fullerton, Calif.

[22] Filed: May 17, 1973

[21] Appl. No.: 361,333

[52] U.S. Cl. .......................... 252/299; 350/160 LC
[51] Int. Cl.$^2$ ..................... G02F 1/13; C09K 3/34
[58] Field of Search ................ 252/408 LC, 299; 350/160 LC

[56] References Cited
UNITED STATES PATENTS

| | | | |
|---|---|---|---|
| 3,540,796 | 11/1970 | Goldmacher et al. | 252/408 LC |
| 3,656,834 | 4/1972 | Haller et al. | 252/408 LC |
| 3,689,525 | 9/1972 | Scheule et al. | 350/160 LC |
| 3,690,745 | 9/1972 | Jones | 252/299 |
| 3,698,449 | 10/1972 | Sorkin et al. | 350/160 LC |
| 3,772,210 | 11/1973 | Lodolini | 252/408 LC |
| 3,816,113 | 6/1974 | Haas et al. | 252/408 LC |
| 3,819,531 | 6/1974 | Saeva et al. | 252/408 LC |
| 3,826,757 | 7/1974 | Wong | 252/408 LC |
| 3,872,140 | 3/1975 | Klanderman et al. | 252/408 LC |

FOREIGN PATENTS OR APPLICATIONS

| | | | |
|---|---|---|---|
| 2,024,269 | 12/1971 | Germany | 252/299 |
| 2,009,528 | 9/1971 | Germany | 252/299 |
| 4,731,882 | 11/1972 | Japan | 252/299 |
| 4,731,884 | 11/1972 | Japan | 252/299 |

OTHER PUBLICATIONS

L. T. Creagh and A. R. Kmetz, "Selective Doping of MBBA to Optimize Display Performance," J. Electron. Mater., Vol. 1, pp. 350–356, (1972).

*Primary Examiner*—Benjamin R. Padgett
*Assistant Examiner*—T. S. Gron
*Attorney, Agent, or Firm*—R. J. Steinmeyer; W. A. Simons

[57] ABSTRACT

Improved liquid crystal compositions comprise a major portion by weight of at least three different p-alkoxybenzylidene-p'-aminophenylalkanoates and a minor portion by weight of p-methoxybenzylidene-p'-butylaniline and p-ethoxybenzylidene-p'-butylaniline. The compositions have broader nematic ranges than either ternary mixtures of the alkanoates or binary mixtures of the other two compounds. In addition, when certain dopants are added to the compositions, optimum improvement in properties is obtained using less dopant than that required by prior art compositions.

20 Claims, 1 Drawing Figure

LIQUID CRYSTAL COMPOSITIONS AND DEVICES

BACKGROUND OF THE INVENTION

This invention relates to improved nematic liquid crystal compositions and to display devices including these compositions.

Nematic liquid crystal compositions are used in electro-optical display devices, as described in U.S. Pat. No. 3,222,485 to Williams. Such devices normally comprise a thin layer of the liquid crystal composition sandwiched between two planar elements. One of the elements is transparent while the other is either transparent, reflective or absorptive, depending on the mode of operation of the device. Conductors are applied to a surface of each of the elements for applying an electric field to selected areas of the liquid crystal layer. When an electric field above a threshold value is applied to the liquid crystal layer, the layer appears to change the intensity of transmitted light in the region of the applied field.

When a negative dielectric anisotropic nematic material is employed as the liquid crystal composition, the apparent change in light intensity is due to a change in the light scattering properties of the composition under the electric field; and when a positive dielectric anisotropic nematic material is employed, the change is due to a change in the ability of the composition to rotate polarized light.

Liquid crystal compositions have two transition temperatures. One is at the transition between the crystalline solid state and the liquid crystal state. The other is at the transition between the liquid crystal state and the isotropic fluid state. Since the composition must be in the liquid crystal state for operation of the display device in which it is employed, it is desirable that the composition be in the liquid crystal state over a broad temperature range (referred to as the nematic range) having its center at room temperature so that the device will operate at varying ambient temperatures.

Other desirable properties of liquid crystal compositions are a high contrast ratio (the ratio of light scattering when an electric field is applied to that when no field is applied) and quick response (rise and decay) times.

As described in U.S. Pat. 3,656,834 to Haller et al., it is desirable to add to a liquid crystal composition a material which improves the homeotropic alignment of the molecules in the composition. Such materials are commonly referred to in the art as "dopants." In addition to improving homeotropic alignment, dopants provide ions which enable negative dielectric anisotropic nematic materials to enter the dynamic scattering mode when subjected to electric fields above threshold voltage. While sufficient dopant must be added so that the composition is in the dynamic scattering mode at desired voltage and frequency, excessive dopant is undesirable because it causes too much current flow, which, in addition to consuming electricity, causes degradation of the liquid crystal molecules.

It is an object of this invention to provide a liquid crystal composition having a broad nematic range with its center at room temperature, and also having other improved properties, including high contrast ratio, quick response times.

SUMMARY OF THE INVENTION

This invention provides negative dielectric anisotropic nematic liquid crystal compositions especially suitable for use in electro-optical display devices. The compositions comprise five compounds. Three of the compounds are different members of the homologous series having the general formula

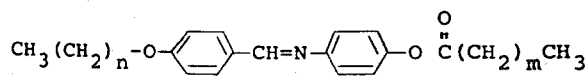

wherein $n$ is an integer from 0 to 3 and $m$ is an integer from 0 to 5, preferably 0 to 3. Each member of the series is present in an amount ranging from about 4 to 80 percent by weight based on the total weight of the three members. The other two of the five compounds are p-methoxybenzylidene-p'-butylaniline (MBBA) and p-ethoxybenzylidene-p'-butylaniline (EBBA), each of which is present in an amount ranging from 30 to 70, preferably 40 to 60, more preferably 45 to 55, percent by weight based on the total weight of the two compounds. The total weight of the three members of the homologous series represents from 40 to 70, preferably 50 to 70, more preferably 55 to 65, percent of the total weight of the composition, and the total weight of the other two compounds represents from 30 to 60, preferably 30 to 50, more preferably 35 to 45, percent of the total weight of the composition.

The members of the homologous series are disclosed in U.S. Pat. No. 3,540,796 to Goldmacher et al., which teaches that mixtures of the members have eutectic points (crystalline solid-liquid crystal transition temperatures) as low as 22°C. MBBA and EBBA are disclosed in U.S. Pat. No. 3,675,987 to Rafuse, which teaches that a certain mixture of the two compounds has a nematic range extending from about −20°C to about 70°C. The compositions of this invention, which include the compounds disclosed in the Rafuse and Goldmacher et al. patents, have nematic ranges greater than any of the compositions disclosed in the two patents. In particular, the compositions of this invention have a nematic range of at least ±50°C of room temperature, i.e., extending from about −27°C or below to about 73°C or above. In preferred embodiments of this invention, the nematic range of the compositions extends from about −50°C to about 85°C.

The other properties of the compositions are at least as good or better than the properties of prior art compositions. For example, the compositions have high contrast ratios and quick response times. Another advantageous property of the compositions is that when two certain dopants are added thereto, the total amount of dopant required to effect the improvement in properties for which the dopants are added is substantially less than the amount of dopant required by prior art compositions to effect the same improvement. Thus, the disadvantages associated with employing excessive dopant are avoided. The particular dopants added to the compositions are p-methoxybenzylidene-p'-aminophenol and a quaternary ammonium salt having the formula RR'R''$_2$N$^+$X$^-$ wherein R is an alkyl group having 10 to 24 carbon atoms, R' is methyl or ethyl, R'' is methyl, or R' and R'' together form a pyridine ring (which may bear substituents), and X$^-$ is an anion derived from a simple acid, such as Cl$^-$, Br$^-$, I$^-$, NO$_3^-$, and the like. The ammonium salt is preferably employed in an amount ranging from about 0.005 to 0.02 percent by weight and the other dopant is employed in an amount ranging from about 0.05 to 0.2 percent by weight. The small amount of total dopant required is due to a synergistic effect between the two dopants. If desired, however, other conventional dopants may be added to the compositions in addition to or in place of these two particular dopants.

The compositions of this invention have threshold voltages of about 12 to 50 volts at 30 to 1000 hertz at thicknesses between about 5 and 50 microns.

The compositions of this invention are suitable for use in electro-optical devices of the type employing a nematic liquid crystal composition. Such devices are well known in the art, so they need not be described in detail here. In general, such devices comprise a layer of a nematic liquid crystal composition between two substrates. One substrate is optically transmissive and has an electrically conductive coating on one face. The other substrate also has an electrically conductive coating on one face and is positioned such that the coatings are adjacent and substantially equidistantly spaced, normally at about 5 to 50 microns. Means are provided for creating an electric field between selected portions of the coatings. Either a light source positioned to direct light toward the substrates or ambient light may be used in operation of the device.

DESCRIPTION OF THE PREFERRED EMBODIMENTS

Figure 1:
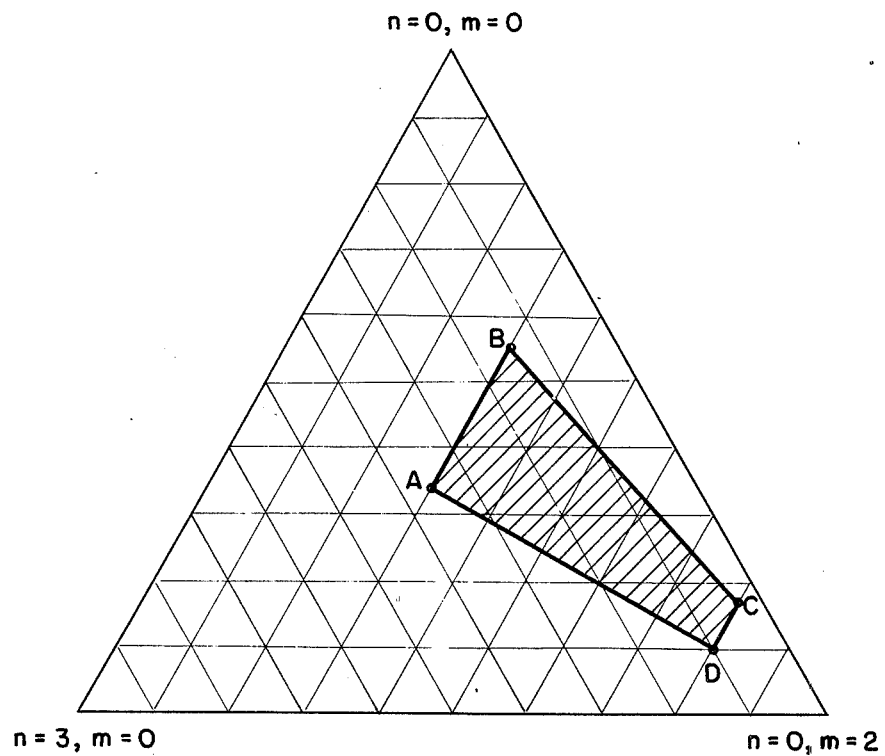
FIG. 1 is a composition diagram illustrating a particularly preferred embodiment of the invention.

In an especially preferred embodiment, the members of the homologous series are the member wherein n is 0 and m is 0, the member wherein n is 3 and m is 0, and the member wherein n is 0 and m is 2. These members are preferably employed in the relative proportions indicated by the shaded area (trapezoid ABCD) in FIG. 1. Each point of the triangle represents 100 percent of the compound identified at the point. For example, the apex of the triangle represents 100 percent of p-methoxybenzylidene-p'-aminophenylacetate, the base represents 0 percent, and the lines parallel to the base represent 10 percent increments of the compound. The coordinates of the trapezoid ABCD are A = 35, 30, 35; B = 56, 30, 14; C = 16, 80, 4; and D = 10, 80, 10. Compositions represented by the shaded area, when combined with MBBA and EBBA in accordance with this invention, have an especially broad nematic range and other desirable properties, including high contrast ratio and quick response times, making them especially suitable as liquid crystal compositions. The compositions generally have a nematic range extending from about −40°C to 85°C.

EXAMPLES

Seven negative dielectric anistropic liquid crystal compositions were prepared by mixing MBBA, EBBA, p-methoxybenzylidene-p'-aminophenyl acetate ($A_1$), p-n-butoxybenzylidene-p' aminophenyl acetate ($A_2$), p-methoxybenzylidene-p'-aminophenyl-n-butanoate ($A_3$), p-methoxybenzylidene-p'-aminophenol ($D_1$), and an ammonium salt ($D_2$) in the relative proportions by weight indicated in Table I.

Table I

| Component | 1 | 2 | 3 | 4 | 5 | 6 | 7 |
|---|---|---|---|---|---|---|---|
| MBBA | 19.978 | 23.968 | 39.912 | 29.951 | 29.951 | 19.978 | 29.984 |
| EBBA | 19.978 | 15.979 | 19.956 | 29.951 | 29.951 | 19.978 | 29.984 |
| $A_1$ | 19.978 | 19.974 | 3.991 | 6.389 | 22.363 | 20.977 | 18.630 |
| $A_2$ | 11.987 | 11.984 | 3.991 | 1.597 | 5.590 | 20.977 | 13.352 |
| $A_3$ | 27.969 | 27.963 | 31.930 | 31.947 | 11.980 | 17.980 | 7.995 |
| $D_1$ | 0.1 | 0.12 | 0.2 | 0.15 | 0.15 | 0.100 | 0.05 |
| $D_2$ | 0.01 | 0.012 | 0.02 | 0.015 | 0.015 | 0.010 | 0.005 |
| Total | 100 | 100 | 100 | 100 | 100 | 100 | 100 |

The ammonium salt in each of the seven compositions had the formula $RR'R_2''NBr$ where R was hexadecyl and R' and R" were as indicated in Table II.

Table II

| Composition | R' | R" |
|---|---|---|
| 1 | ethyl | methyl |
| 2 | | pyridine |
| 3 | methyl | methyl |
| 4 | | pyridine |
| 5 | | pyridine |
| 6 | | pyridine |
| 7 | | pyridine |

All compositions gave excellent results as liquid crystal materials in an electro-optical display device which was typical of those known in the art and in which the distance between the substrates was about 12.5 microns. The compositions had the properties indicated in Table III.

Table III

| Property | | 1 | 2 | 3 | 4 | 5 | 6 | 7 |
|---|---|---|---|---|---|---|---|---|
| Nematic Range,[1]°C | From | −49 | −51 | −55 | −56 | −54 | −50 | −22 |
| | To | 85.5 | 86 | 75.5 | 78 | 76 | 87 | 77.5 |
| Threshold Voltage,[2] volts | | 10 | 10 | 7.5 | 8 | 8 | 10.5 | 9 |
| Resistivity, ohm cm × 10⁹ | | 2.2 | 2.5 | 0.9 | 1.2 | 1.3 | 3.5 | 4.5 |
| Contrast Ratio[3] | | 60:1 | 50:1 | 60:1 | 60:1 | 55:1 | 60:1 | 55:1 |

[1]As determined by differential scanning colorimeter.
[2]The voltage at which the contrast ratio became 20:1.
[3]Measured at 25 volts at room temperature.

What is claimed is:

1. A liquid crystal composition having a nematic range of at least ±50°C of room temperature comprising five compounds wherein three of the compounds are different members of the homologous series having the general formula

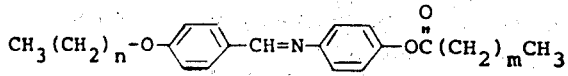

wherein n is an integer from 0 to 3 and m is an integer from 0 to 5, each member being present in an amount ranging from 4 to 80 percent by weight based on the total weight of the three members, and the other two compounds are p-methoxybenzylidene-p'-n-butylaniline and p-ethoxybenzylidene-p'-n-butylaniline, each of the two other compounds being present in an amount ranging from 30 to 70 percent by weight based on the total weight of the two compounds, and wherein the total weight of the three members of the homologous series represents from 40 to 70 percent of the total weight of the composition and the total weight of two other compounds represents from 30 to 60 percent of the total weight of the composition.

2. The composition of claim 1 wherein the total weight of the three members of the homologous series represents from 50 to 70 percent of the total weight of the composition, and the total weight of the other two of the five compounds represents from 30 to 50 percent of the total weight of the composition.

3. The composition of claim 2 wherein each of the two other compounds are present in an amount ranging from 40 to 60 percent by weight based on the total weight of the two compounds.

4. The composition of claim 3 wherein m is an integer from 0 to 3.

5. The composition of claim 4 wherein the total weight of the three members of the homologous series represents from 55 to 65 percent of the total weight of the composition, and the total weight of the other two of the five compounds represents from 35 to 45 percent of the total weight of the composition.

6. The composition of claim 5 wherein each of the other two compounds are present in an amount ranging from 45 to 55 percent by weight based on the total weight of the two compounds.

7. The composition of claim 6 wherein the three members of the homologous series are the member wherein n is 0 and m is 0, the member wherein n is 3 and m is 0, and the member wherein n is 0 and m is 2.

8. The composition of claim 7 wherein the three members are present in the relative proportions indicated in FIG. 1.

9. The composition of claim 1 including about 0.050 to 0.2 percent by weight of p-methoxybenzylidene-p'-aminophenol and about 0.005 to 0.02 percent by weight of a quaternary ammonium salt having the formula $RR'R_2''N^+X^-$ wherein R is an alkyl group having 10 to 24 carbon atoms, R' is methyl or ethyl, R'' is methyl, or R' and R'' together form a pyridine ring, and $X^-$ is an anion derived from a simple acid.

10. The composition of claim 8 including about 0.050 to 0.2 percent by weight of p-methoxybenzylidene-p'-aminophenol and about 0.005 to 0.02 percent by weight of a quaternary ammonium salt having the formula $RR'R_2''N^+X^-$ wherein R is an alkyl group having 10 to 24 carbon atoms, R' is methyl or ethyl, R'' is methyl, or R' and R'' together form a pyridine ring, and $X^-$ is an anion derived from a simple acid.

11. In an electro-optical display device comprising a layer of a nematic liquid crystal composition between two substrates, one substrate being optically transmissive and having an electrically conductive coating on one face, the other substrate having an electrically conductive coating on one face and positioned such that the coatings are adjacent and substantially equidistantly spaced, and means for creating an electric field between selected portions of the coatings, the improvement wherein the liquid crystal composition has a nematic range of at least ± 50°C of room temperature and comprises five compounds wherein three of the compounds are different members of the homologous series having the general formula

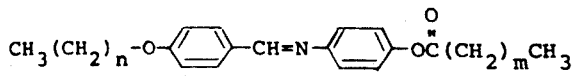

wherein n is an integer from 0 to 3 and n is an integer from 0 to 5, each member being present in an amount ranging from 4 to 80 percent by weight based on the total weight of the three members, and the other two compounds are p-methoxybenzylidene-p'-nbutylaniline and p-ethoxybenzylidene-p'-n-butylaniline, each of the two other compounds being present in an amount ranging from 30 to 70 percent by weight based on the total weight of the two compounds, and wherein the total weight of the three members of the homologous series represents from 40 to 70 percent of the total weight of the composition and the total weight of two other compounds represents from 30 to 60 percent of the total weight of the composition.

12. The device of claim 11 wherein the total weight of the three members of the homologous series represents from 50 to 70 percent of the total weight of the composition, and the total weight of the other two of the five compounds represents from 30 to 50 percent of the total weight of the composition.

13. The device of claim 12 wherein each of the two other compounds are present in an amount ranging from 40 to 60 percent by weight based on the total weight of the two compounds.

14. The device of claim 13 wherein m is an integer from 0 to 3.

15. The device of claim 14 wherein the total weight of the three members of the homologous series represents from 55 to 65 percent of the total weight of the composition, and the total weight of the other two of the five compounds represent from 35 to 45 percent of the total weight of the composition.

16. The device of claim 15 wherein each of the other two compounds are present in an amount ranging from 45 to 55 percent by weight based on the total weight of the two compounds.

17. The device of claim 16 wherein the three members of the homologous series are the member wherein n is 0 and m is 0, the member wherein n is 3 and m is 0, and the member wherein n is 0 and m is 2.

18. The device of claim 17 wherein the three members are present in the relative proportions indicated in FIG. 1.

19. The device of claim 11 wherein the liquid crystal composition includes about 0.050 to 0.2 percent by weight of p-methoxybenzylidene-p'-aminophenol and about 0.005 to 0.02 percent by weight of a quaternary ammonium salt having the formula $RR'R_2''N^+X^-$ wherein R is an alkyl group having 10 to 24 carbon atoms, R' is methyl or ethyl, R'' is methyl, or R' and R'' together form a pyridine ring, and $X^-$ is an anion derived from a simple acid.

20. The device of claim 18 wherein the liquid crystal composition includes about 0.050 to 0.2 percent by weight of p-methoxybenzylidene-p′-aminophenol and about 0.005 to 0.02 percent by weight of a quaternary ammonium salt having the formula $RR'R_2''N^+X^-$ wherein R is an alkyl group having 10 to 24 carbon atoms, R′ is methyl or ethyl, R″ is methyl, or R′ and R″ together form a pyridine ring, and $X^-$ is an anion derived from a simple acid.

* * * * *

UNITED STATES PATENT OFFICE
CERTIFICATE OF CORRECTION

Patent No. 3,956,167          Dated May 11, 1976

Inventor(s) Chan Soo Oh

It is certified that error appears in the above-identified patent and that said Letters Patent are hereby corrected as shown below:

In column 6, line 17, the letter "n" second occurrence should read --m--. Column 6, lines 21 and 22, "p-methoxybenzylidene-p'-nbutylaniline" should read -- p-methoxybenzylidene-p'-n-butylaniline --.

Signed and Sealed this

Seventeenth Day of August 1976

[SEAL]

Attest:

RUTH C. MASON
Attesting Officer

C. MARSHALL DANN
Commissioner of Patents and Trademarks